United States Patent [19]

Lee

[11] 4,283,438
[45] Aug. 11, 1981

[54] METHOD FOR INDIVIDUALLY ENCAPSULATING MAGNETIC PARTICLES

[75] Inventor: Lawrence L. Lee, Fort Wayne, Ind.

[73] Assignee: Magnavox Government and Industrial Electronics Company, Fort Wayne, Ind.

[21] Appl. No.: 106,793

[22] Filed: Dec. 26, 1979

[51] Int. Cl.³ .............................................. B05D 3/14
[52] U.S. Cl. ...................................... 427/47; 427/128
[58] Field of Search ................................. 427/47, 128

[56] References Cited

U.S. PATENT DOCUMENTS 1,407,067  2/1922  Johnson .................................. 427/47

FOREIGN PATENT DOCUMENTS 52-098066  2/1977  Japan

*Primary Examiner*—Bernard D. Pianalto
*Attorney, Agent, or Firm*—Thomas A. Briody; William J. Streeter; William J. Iseman

[57] ABSTRACT

A method for encapsulating magnetic particles by enclosure within oil drops, mixing in an aqueous solution and dispersing the oil drops with the enclosed particles by application of an alternating magnetic field. The dispersed and oil-covered particles are microencapsulated with at least one type of polymer.

18 Claims, 3 Drawing Figures

METHOD FOR INDIVIDUALLY ENCAPSULATING MAGNETIC PARTICLES

BACKGROUND OF THE INVENTION

This invention relates generally to magnetic particle displays and particularly to apparatus and a method for individually encapsulating magnetic particles for use in such displays. Magnetic particle displays are typically flat panel, matrix addressable display devices. The displays form images on a panel of freely rotating spherical particles, each of which is a tiny permanent magnet, dark colored in one hemisphere and light colored in the other. Thus, the amount of ambient light reflected by the particles is a function of the particles orientation which is controlled by a magnetic field. Since the magnetic particles are generally spherical as opposed to disk shaped, the particles do not need to be pivoted for rotation. It is then practical to use very small particles on the order of 1 millimeter (mm) or less in diameter or linear dimension and in very large numbers. The magnetic particles are typically smaller than can be resolved by the naked eye thus giving the display a high resolution.

Fabrication of a magnetic particle display requires combined efforts in four rather unrelated technological areas. First, one must make the spherical particle. Second, one must impart to these particles the desired optical and magnetic properties. Third, the particles must be encapsulated for positioning on the surface on which the image is to be produced; and finally, a magnetic field must be provided to control the orientation of the encapsulated particles. The method and apparatus of the present invention are concerned with and are directed to the foregoing noted third step of fabrication wherein the particles are encapsulated for placement within the environment wherein the image is to be produced. More particularly, a method is needed to encapsulate individual ones of the extremely small particles within a carrier fluid medium for rotatable installation within the display. One of the more difficult problems involved in encapsulation is the dispersal of a large number of agglomerated magnetized spherical particles in such a manner that individual ones of the particles can be separately and uniquely placed within associated ones of the capsules. Since the particles are magnetized, they tend to attract each other due to the inherent magnetic forces and thus resist separation and dispersal for placement into individual capsules. Furthermore, surface tension of the surrounding liquid prevents the particles from being separated. The surface tension force can be characterized as a short range force that generally operates only when the particles are in very close proximity to each other and is a relatively strong force to overcome. The magnetic force, in contrast, can be characterized as a long range force that tends to pull particles together from greater distances and is a relatively weak force, especially at large distances.

One method known in the prior art for providing dispersal of the agglomerated magnetized particles is the use of mechanical agitation devices which interact with and disperse the agglomerated particles when such particles are placed in a carrier fluid such as oil. In such a method, the degree to which the dispersal is accomplished largely depends on the intensity of the applied mechanical forces with the greater applied mechanical forces resulting in the greater dispersal but also with the concurrent possibility of removing all the oil surrounding the particles. The implementation of such a method requires a certain delicacy and sensitivity in impacting the particles with the agitating means so as to create a reasonable yield of oil-covered useful particles.

SUMMARY OF THE INVENTION

Accordingly, it is an object of the present invention to provide an apparatus and a method for dispersing individual ones of magnetized particles by magnetic means to insure that each of the particles is fully coated with carrier fluid. Another object of the invention is to provide an apparatus and a method for dispersing individual ones of magnetic particles to produce a high yield of particles useful in a magnetic display. Yet another object of the invention is to provide a method for encapsulating magnetic particles in order to permit rotation of individual particles within associated capsules. Still another object of the invention is to provide a method for encapsulating individual ones of magnetic particles for increasing the encapsulated particles resistance to impacting external forces and to provide for easier handling and placement of the encapsulated particles in a display.

Briefly, these and other objects are accomplished by an apparatus and a method for encapsulating magnetic particles by immersion in oil drops, mixing the oil drops in an aqueous solution and causing individual ones of the agglomerated particles within the aqueous oil solution to individually disperse by application of an alternating magnetic field. The individually dispersed particles, still under the influence of the magnetic field, are microencapsulated with at least one type of polymer by means of the addition of a polymer-forming material to the oil-water suspension to form a relatively hard shell enclosing the magnetized particle within the oil. Once coated with a solid capsule wall, the effects of surface tension are removed, and the particles are relatively easy to separate again even if they have been allowed to agglomerate. The shell may be coated by additional polymer which provides a yet thicker capsule wall about the enclosed particle and which capsule is easily handled for placement within the magnetic display.

For a better understanding of these and other aspects of the invention, reference may be made to the following detailed description taken in conjunction with the accompanying drawings.

DESCRIPTION OF THE PREFERRED EMBODIMENT

According to the instant invention, a method is provided for dispersing oil-covered magnetic particles in an aqueous medium such that each of the individually enclosed magnetic particles are microencapsulated in a transparent solid shell that permits relatively easy handling for placement in a magnetic particle display.

Figure 1:
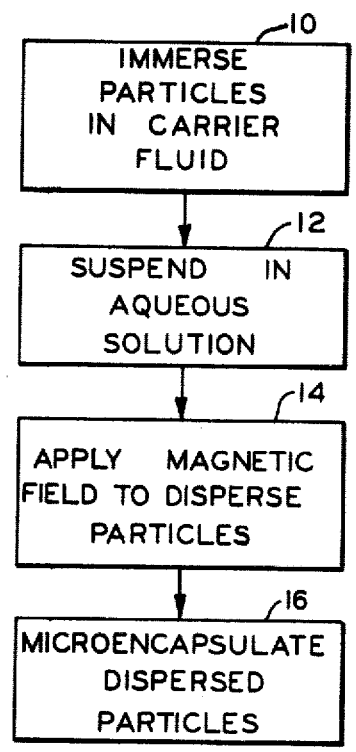
FIG. 1 is a block diagram of the sequential steps of the method according to the present invention.

Referring now to FIG. 1 there is shown a block diagram of the steps used in the encapsulation method of the present invention. The method is useful with a variety of differing magnetic particle types and, in the preferred method of the present invention, the particles used were of a strontium ferrite material enclosed in a polyethylene binder forming a spherical particle approximately 200 μm in diameter. The magnetic coercive force of the strontium ferrite is approximately 2000 oersted. The particles are preferrably colored and encapsulated in a transparent shell for use in a magnetic particle display. Typically, one hemisphere of the particle is colored with a dark color and the remaining hemisphere of the particle is colored with a contrasting color. Various methods of manufacture of the particles and the coloring thereof are known in the art and the details thereof are not discussed herein. Block 10 of the diagram illustrates the first step of the method wherein the magnetized particles are first immersed in a carrier fluid such as oil or other oily fluids such as fluorocarbons, polysiloxanes, or esters. The purpose of the oil is to provide a fluid which surrounds the particle and permits rotation of the particle under the influence of a magnetic field. The oil which surrounds the particle is sometimes referred to in the art of microencapsulation, as the "internal phase". This is in contrast to another fluid medium in which the oil drop will be suspended and which is referred to as the "continuous phase". The oil is generally one of many transparent liquids that are not miscible with water, and, in the preferred method, a silicone oil having a viscosity of 5 centistokes (cst.) is used.

Once immersed in the oil, the particles are then suspended in the continuous phase which, in most cases, is an aqueous solution as shown in the second step of the method as noted in block 12. The aqueous solution is a mixture of water and an additional appropriate amount of surfactant which is used to reduce interfacial tension and to prevent the particles from leaving the oil drops. The surfactant in the preferred method is L77 surfactant available from Union Carbide Chemicals, New York, and it is applied at a concentration of 0.03% in water. The immersed particles are transferred to the water solution with an eye dropper or pipette and dropped into the water. These drops are generally a few millimeters in diameter and may agglomerate into larger drops.

The suspended drops within the water solution are then exposed to a magnetic field as noted in the third step of the method in block 14. An alternating magnetic field having an amplitude of approximately 300 oersted is preferably used at a frequency of approximately 150 Hertz (hz.). For higher viscosity oils, such as paraffin oil, the desired frequency is lower, such as, for example, 50 hz. After the applied magnetic field has caused the larger drops to break up into smaller ones, the frequency may be increased and the process repeated, causing the drops to become smaller after each change of frequency. The frequency may be increased in discrete steps, in which case each step should represent a frequency increase of not more than 50% in order to maintain stability within the dispersal process. Moreover, in the case of discrete frequency changes, the applied magnetic field should be maintained at each frequency for at least two hundred cycles before being switched to a higher frequency. Gradual increase of the frequency is necessary for dispersion of the oil drops because at each respectively differing frequency, only oil drops of a particular size range will disperse into smaller drops. For example, at 600 hz. frequency, drops of 5 cst. silicone oil approximately 2 mm diameter containing hundreds of magnetic particles will not disperse. For silicone oils having a viscosity of 5 cst. a frequency of approximately 800 hz. will typically be reached before the drops become so small that most all of the drops contain but one magnetic particle. Alternatively, the magnetic field dispersal process may be varied to control the size of the drops such that any desired average number of particles are enclosed therein.

After dispersal by the magnetic field to the point where the desired average number of particles are contained within each drop, the microencapsulation step of the method may begin as noted in the fourth step of block 16 in the diagram. During the encapsulation process, the magnetic field is maintained at the highest frequency last used to disperse the drops in order to maintain the drops in a dispersed relationship during the microencapsulation process. The microencapsulation step is begun by application of a polymer coating on the drop surface between the oil and the water. In the preferred method, acid chlorides are first added to the oil to form the internal phase. The internal phase consists of a saturated solution of sebacoyl chloride, azelaoyl chloride, and trimesoyl chloride in silicone oil. After the magnetic particles contained within the internal phase have been sufficiently dispersed and are ready to be microencapsulated, a sufficient quantity of diethylenetriamine is added to the aqueous solution to reach a final concentration of approximately 5% with the result that an interfacial film of polyamide is thus rapidly formed. The polyamide polymer coating is formed due to the interfacial reaction between the amine in the water and the acid chlorides in the oil. The interfacial reaction is accomplished in less than a second. The resultant polymer coating, although encapsulating the entrapped particle within the oil carrier fluid, is usually relatively thin and at this point may not withstand the rough handling encountered in further processing. Accordingly, it may be necessary to optionally build up and increase the thickness and strength of the capsule by the application of an additional coating in the microencapsulization step of the method.

Various microencapsulation techniques are known in the art and are disclosed, for example, in the text "Microcapsules and Microencapsulation Techniques" by M. Gutcho, Noyes Data Corporation, Park Ridge, N.J. (1976). During the latter optional portion of the microencapsulation step, the magnetic field force may be substantially reduced inasmuch as dispersion may be more easily maintained due to the previously applied polymer coating which enables redispersion of the agglomeration of the enclosed particles.

Once microencapsulated, the magnetic particles are entrapped in transparent shells having at least one polymer coating. The capsules are sufficiently strong so as to withstand normal handling for placement into a magnetic particle display. The placement of the particles in the display may be done in any well known fashion such as by adhesion on to a substrate.

Figure 2:
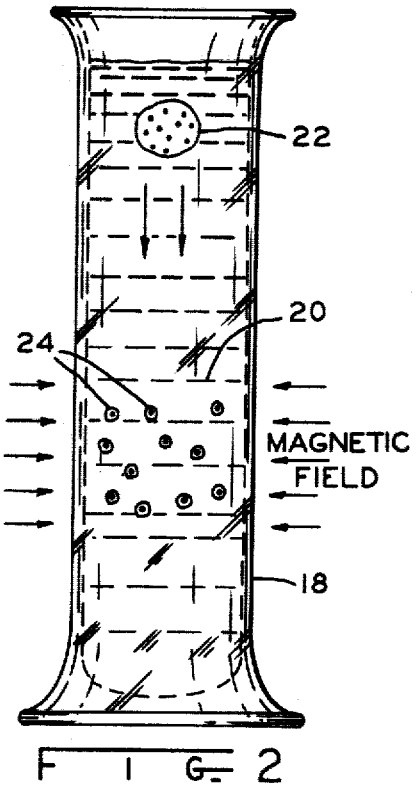
FIG. 2 is a side elevation view of a container illustrating the dispersal of magnetic particles while under the influence of a magnetic field according to the invention.

FIG. 2 illustrates a side view of a container 18 such as a glass beaker which is used to hold the aqueous solution 20. More clearly illustrated is a particular one of the oil-immersed drops 22 having a number of particles enclosed therein. As the drop 22 gravitates downward within the container 18 and comes within the influence of a magnetic field shown applied about the container, the single drop 22 disperses into a plurality of smaller drops 24 each having enclosed therein a single particle. The particles are suspended in the solution and exhibit apparently random motion due to the influence of the applied magnetic field.

Figure 3:
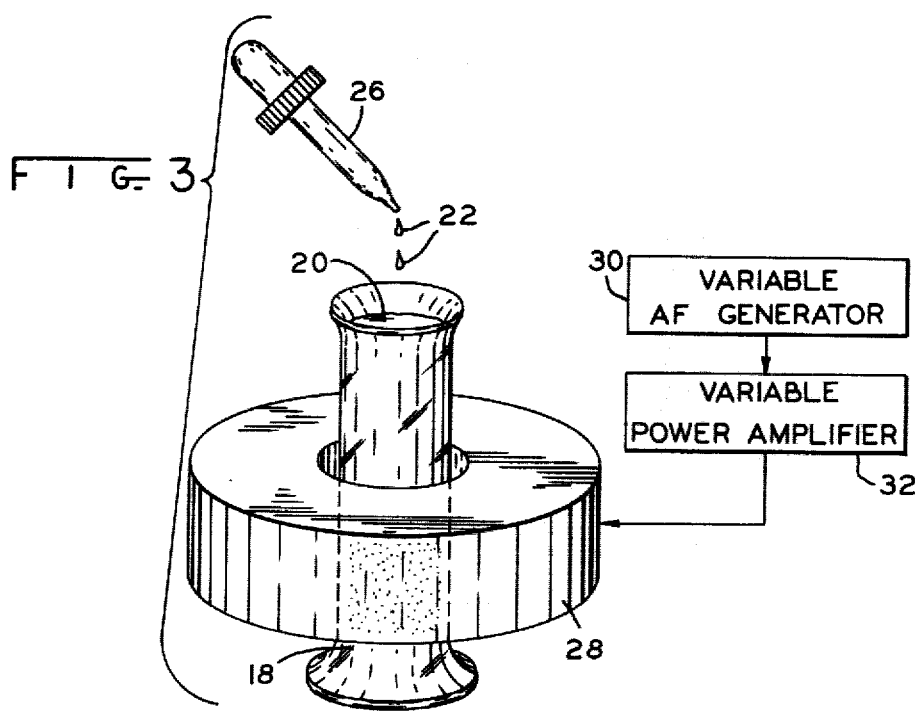
FIG. 3 is a simplified illustration and block diagram of apparatus for dispersing the particles according to the method of the present invention.

FIG. 3 illustrates the apparatus used in the dispersal and encapsulation process of the preferred method. An eye dropper 26 having a quantity of oil-immersed particles therein is activated to cause a number of the immersed particles to form into the drops 22 which are dropped into the container 18. The container 18 is used to hold the aqueous solution noted hereinbefore in the operation of the preferred method during dispersal and microencapsulation. As also noted hereinbefore, a selected amount of surfactant is added to the water in combination with the oil drops containing the enclosed particles. An alternating magnetic field is applied to the aqueous solution by a means of a field coil 28 driven by a variable audio frequency (AF) generator 30 whose output is coupled to a variable power amplifier 32 whose output drives the coil. The field intensity and frequency are conveniently varied for purposes of implementation of the inventive method by conventional means in adjusting the generator 30 and the amplifier 32.

Although the dropper means have been illustrated as an eye dropper 26, it will be appreciated that alternate means such as a pipette or a spoon may be utilized in the method of the present invention to achieve economies of scale in production and efficiency.

Thus there may be seen that there has been provided a novel apparatus and method for dispersing and encapsulating magnetic particles to insure placement of a desired average number of particles within an associated capsule.

Obviously, many modifications and variations of the invention are possible in light of the above teachings. It is therefore to be understood that within the scope of the appended claims the invention may be practiced otherwise than as specifically described.

What is claimed is:

1. A method for encapsulating a preselected average number of magnetized particles which may be rotated within individual capsules for use in a magnetic particle display comprising the steps of:
   immersing the particles in a liquid internal phase;
   forming drops of the internal phase containing said particles;
   suspending said drops in a liquid continuous phase;
   applying a varying magnetic field to said suspension for dispersing said particles and forming smaller drops with a reduced number of particles in each drop, the frequency of said field variations being selected according to the desired number of particles in individual drops;
   microencapsulating individual ones of said drops to form capsules containing drops in which said particles are rotatable.

2. The method of claim 1 including the step of progressively increasing the frequency of said field variations with time to progressively disperse said particles and progressively reduce the number of particles in individual drops.

3. The method of claim 2 wherein the step of progressively increasing the frequency of said field variations with time comprises increasing the field variations in discrete steps, each step being of an increased frequency over the frequency of the previous step.

4. The method of claim 3 wherein the frequency change between steps is less than 50% and there is a period corresponding to at least 200 cycles between each increase.

5. The method of claim 1 or 2 wherein the number of said particles in individual drops is reduced to one.

6. The method of claim 1 wherein the step of applying a varying magnetic field comprises applying a field of alternating magnetic polarity.

7. A method according to claim 1 wherein the step of applying the alternating magnetic field further comprises varying the intensity and frequency of said field to control dispersal of the particles.

8. The method according to claim 7 wherein said internal phase is a transparent oil.

9. The method according to claim 8 wherein said continuous phase comprises water and a selected amount of surfactant.

10. The method according to claim 9 wherein the step of suspending the immersed particles further comprises dropping selected amounts of said immersed particles into said continuous phase.

11. The method according to claim 8 wherein said transparent oil comprises silicone.

12. A method for dispersing a preselected average number of magnetized particles, the particles being enclosed in a discrete amount of internal phase to permit rotation of the particle therein, comprising the following sequential steps:
   1. immersing the particles in a liquid internal phase;
   2. suspending internal phase drops containing the immersed particles in a liquid continuous phase; and
   3. applying a varying magnetic field to said suspension for dispersing said particles within their associated drops of said internal phase to control the size of the drops and the number of particles in the drops.

13. The method according to claim 12 wherein said magnetic field is alternated during the dispersal step.

14. The method according to claim 13 wherein the step of applying the alternating magnetic field further comprises varying the intensity and frequency of said field to control dispersal of the particles.

15. The method according to claim 14 wherein said internal phase is a transparent oil.

16. The method according to claim 15 wherein said transparent oil comprises silicone.

17. The method according to claim 15 wherein the step of suspending the immersed particles further comprises dropping selected amounts of said immersed particles into said continuous phase.

18. The method according to claim 14 wherein said continuous phase comprises water and a selected amount of surfactant.

* * * * *